United States Patent [19]
Bloom et al.

[11] Patent Number: 5,771,838
[45] Date of Patent: Jun. 30, 1998

[54] BIRD FEEDER WITH FEED RECAPTURE RESERVOIR

[76] Inventors: David Scott Bloom; Michael Andrew Bloom; Drucella Ann Bloom; Timothy K. Bloom, all of 7203 W. Wier Ave., Phoenix, Ariz. 85043

[21] Appl. No.: 632,553

[22] Filed: Apr. 15, 1996

[51] Int. Cl.$^6$ ..................................................... A01K 39/01
[52] U.S. Cl. ........................ 119/52.2; 119/464; 119/469; 119/477
[58] Field of Search .................................. 119/52.2, 454, 119/456, 464, 469, 477

[56] References Cited

U.S. PATENT DOCUMENTS

| | | | |
|---|---|---|---|
| 2,031,874 | 2/1936 | Butler et al. | 119/464 |
| 2,532,726 | 12/1950 | Lajoie et al. | 119/52.2 |
| 2,699,752 | 1/1955 | Reyes | 119/52.2 |
| 4,046,108 | 9/1977 | Balgemann et al. | 119/469 |
| 5,095,847 | 3/1992 | Coffer | 119/52.2 |

FOREIGN PATENT DOCUMENTS

| | | | |
|---|---|---|---|
| 1197669 | 7/1965 | Germany | 119/52.2 |

*Primary Examiner*—Robert P. Swiatek
*Assistant Examiner*—Elizabeth Shaw
*Attorney, Agent, or Firm*—Parsons & Goltry; Robert A. Parsons; Michael W. Goltry

[57] ABSTRACT

A bird feeder for recapturing bird feed for re-use, the bird feeder including a feed reservoir for receiving bird feed and having a feeder opening, a trough coupled to the feed reservoir at the feed opening for receiving feed from the feed reservoir, and a recapture reservoir coupled to the feed reservoir for receiving and collecting uncontaminated bird feed displaced from the trough.

12 Claims, 3 Drawing Sheets

BIRD FEEDER WITH FEED RECAPTURE RESERVOIR

CROSS REFERENCE TO RELATED APPLICATION

This application claims priority to Design United States Application entitled MULTI-CHUTE BIRD FEEDER WITH RECAPTURE BINS, Ser. No. 29/020,995, filed 6 Apr. 1994.

FIELD OF THE INVENTION

This invention relates to feed containers for birds.

More particularly the present invention relates to self feeding bird feeders.

BACKGROUND OF THE INVENTION

There is a long history of birds being kept in captivity. They are kept in cages or enclosures for breeding, for sale, for maintaining as ornamental or decorative additions or simply as pets and companions. Each different use has different requirements for maintenance, but each requires that the birds be fed and maintained in a healthy state.

Typically, birds are fed by employing a feeder containing feed such as bird seed. Often, the feeder is simply an open container such as a bowl set on the floor of the cage. Others are open containers attached to the inside of the cage or supported on a pedestal or perch. The problem with these simple feeders, is that the birds have unlimited access to the entire supply of feed. As bird owners well know, birds have a tendency to scratch at and throw feed around, often going through large quantities of feed while consuming only a small percentage. The feed that is thrown to the bottom of the cage must generally be removed and discarded since it becomes contaminated by excrement from the occupants of the cage or enclosure. In many instances the container with the feed in it will be directly contaminated by the occupants of the cage or enclosure necessitating the cleaning and resupplying of the container. While contamination of feed is a problem for all bird owners, it is a particular problem for bird breeders who may have many birds. Contamination of feed can spread disease and parasites which will adversely effect the breeders ability to raise and sell healthy birds.

Waste of feed may be partially limited by using small containers holding a limited amount of feed. The problem with this approach is that the container must be constantly monitored and replenished by the birds caretaker. This adds additional time and effort in caring for the birds and is less than satisfactory in reducing wasted feed, because it is still dispersed from the container, although at a lesser rate.

Many feeders have been devised to limit the access to the feed by providing a small pan coupled to an enclosed reservoir. As the feed is removed from the pan, additional feed moves from the reservoir, replenishing the pan. These gravity feeders limit the amount of feed which is accessible, thereby reducing the amount of feed thrown to the bottom of the cage at any one time, and reducing the amount of feed that can be directly contaminated. While reducing the problem to some extent, a large amount of feed is still wasted. For individual bird owners this problem can be annoying and increase the cost of keeping a bird. For bird breeders however, the feed costs can be quite large ultimately being reflected in the price charged for the sale of the birds.

Furthermore, the containers and feeders are generally mounted in the cage or enclosure requiring that the cage be entered for replenishment of feed. This can be an irritant for the occupant, and while troublesome for pets, can be very detrimental to the business of breeding birds. Encroachment on a birds territory can result in reduced or complete cessation of breeding.

It would be highly advantageous, therefore, to remedy the foregoing and other deficiencies inherent in the prior art.

Accordingly, it is an object of the present invention to provide a new and improved bird feeder.

Another object of the invention is to provide a new and improved bird feeder which will recapture displaced or thrown feed.

And another object of the invention is to provide a new and improved bird feeder which will substantially eliminate direct contamination of feed.

Still another object of the present invention is to provide a new and improved bird feeder which can be re-supplied from outside a cage or enclosure.

Yet another object of the invention is to provide a new and improved bird feeder which continuously provides clean feed.

SUMMARY OF THE INVENTION

Briefly, to achieve the desired objects of the instant invention in accordance with a preferred embodiment thereof, provided is a bird feeder for recapturing bird feed for re-use, the bird feeder including a feed reservoir for receiving bird feed and having a feeder opening, trough coupled to the feed reservoir at the feed opening for receiving feed from the feed reservoir, and a recapture reservoir coupled to the feed reservoir for receiving and collecting uncontaminated bird feed displaced from the trough.

In a further embodiment, the bird feeder includes a recapture bin and a chute, the chute positioned under the trough and sloped to directed displaced feed into the recapture bin.

In yet another embodiment, the bird feeder includes a perch coupled proximate the trough and upon which birds may rest to obtain access to the trough, the perch being positioned so at not to overlying the collection chute and thereby preventing contamination of the recapture reservoir.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
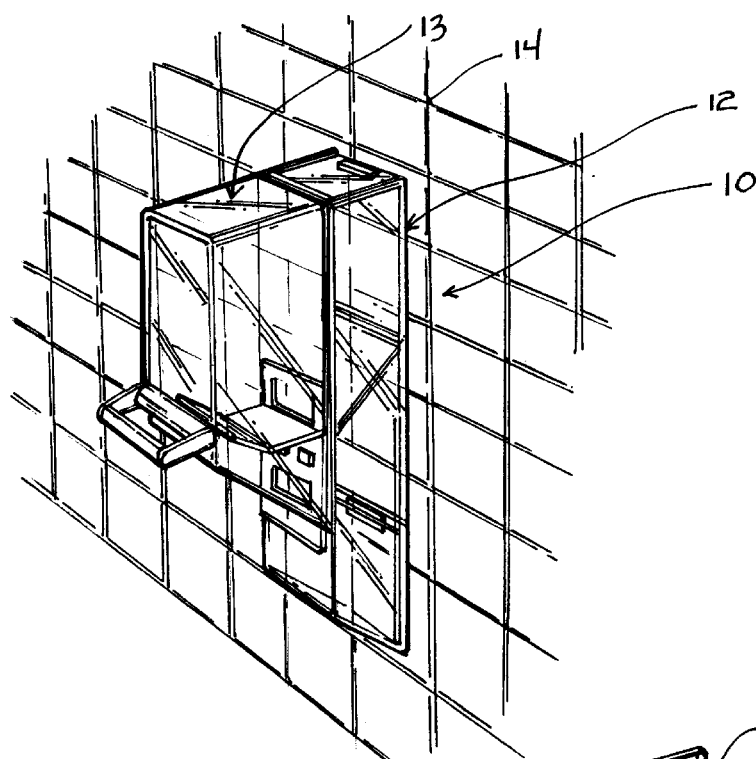
FIG. 1 is a perspective view illustrating a bird feeder constructed in accordance with the teachings of the present invention as it would appear coupled to a bird cage.

Turning now to the drawings in which like reference characters indicate corresponding elements throughout the several views, attention is first directed to FIG. 1 which illustrates a bird feeder generally designated 10 and constructed in accordance with the teachings of the present invention. Bird feeder 10 includes an outer portion of 12 and an inner portion 13 coupled together on opposing sides of a partition 14. Partition 14 is a portion of a cage or enclosure, not shown in its entirety, which, in this instance, is constructed of a mesh of metal strands. It will be readily apparent to one skilled in the art that partition 14 can be substantially any cage or enclosure separating an inside, in which birds are kept, from an outside. Further, as will become readily apparent from the ensuing description, the partition can be formed of substantially any material, and can even be solid, with apertures only for attachment members and passing of feed which will be described presently.

In the ensuing description terms designating an inward direction and terms designating an outward direction will be employed to provide orientation for the varied elements. The terms inwardly or inner are employed to describe a direction or surface toward the inside of the cage or enclosure while outwardly or outer describes a direction or surface toward the outside of the cage or enclosure.

Figure 2:
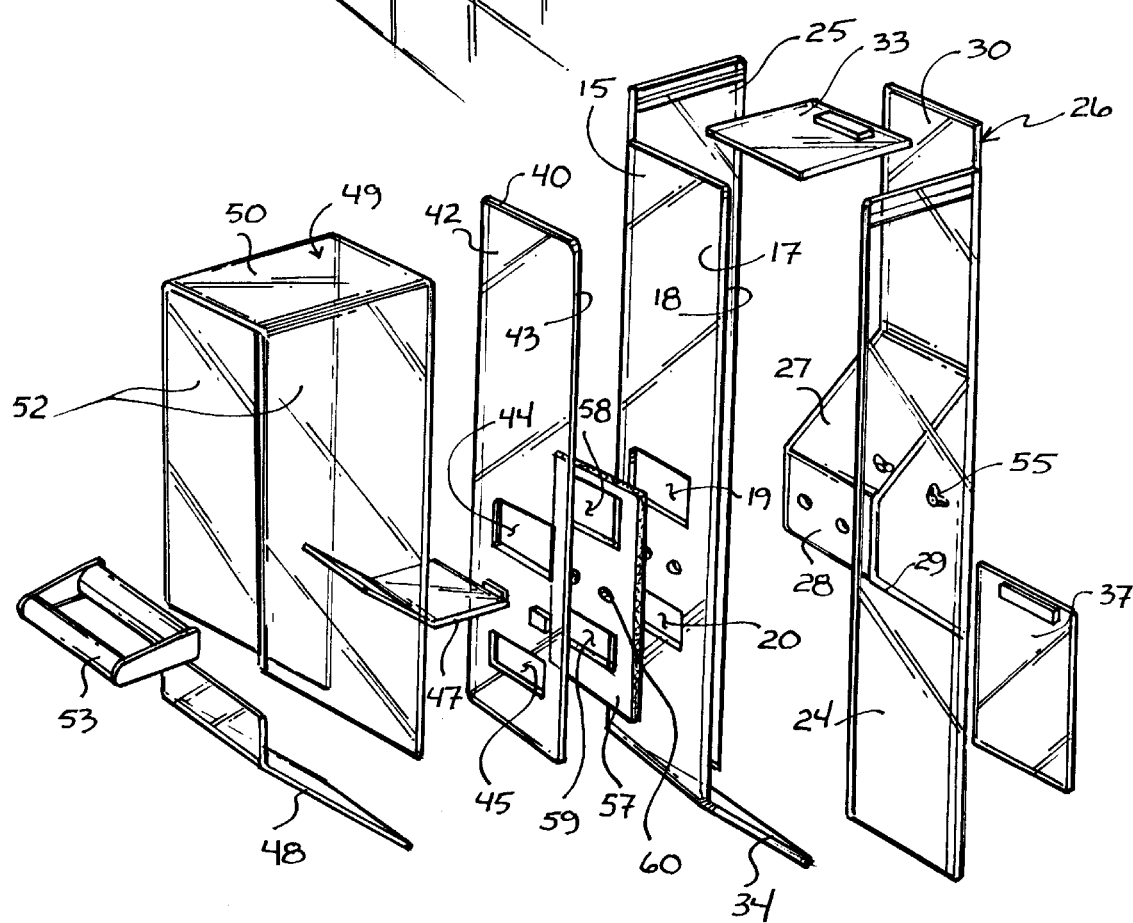
FIG. 2 is an exploded perspective view of the bird feeder of FIG. 1
Figure 3:
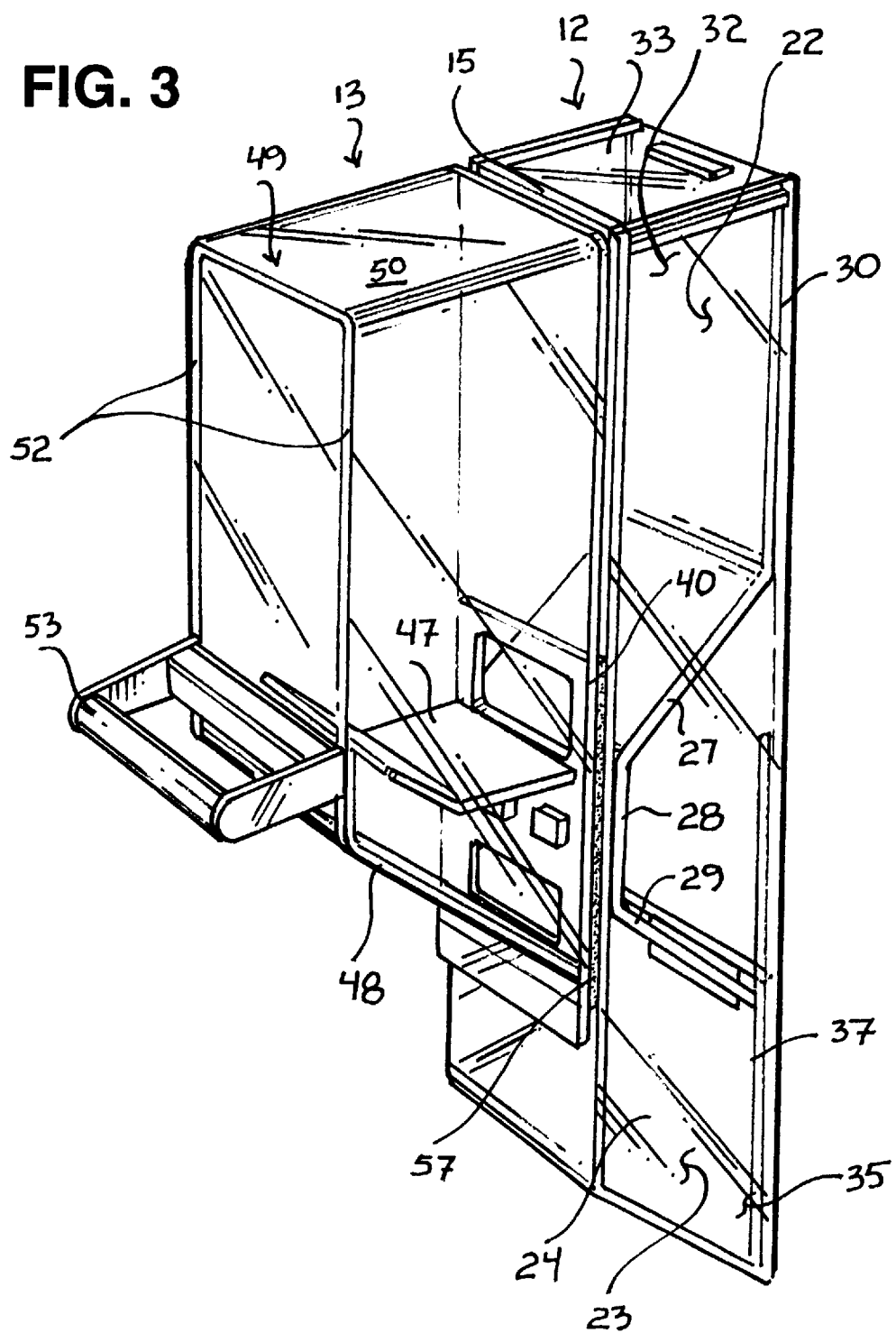
FIG. 3 is a perspective view of the bird feeder of FIGS. 1 and 2.
Figure 4:
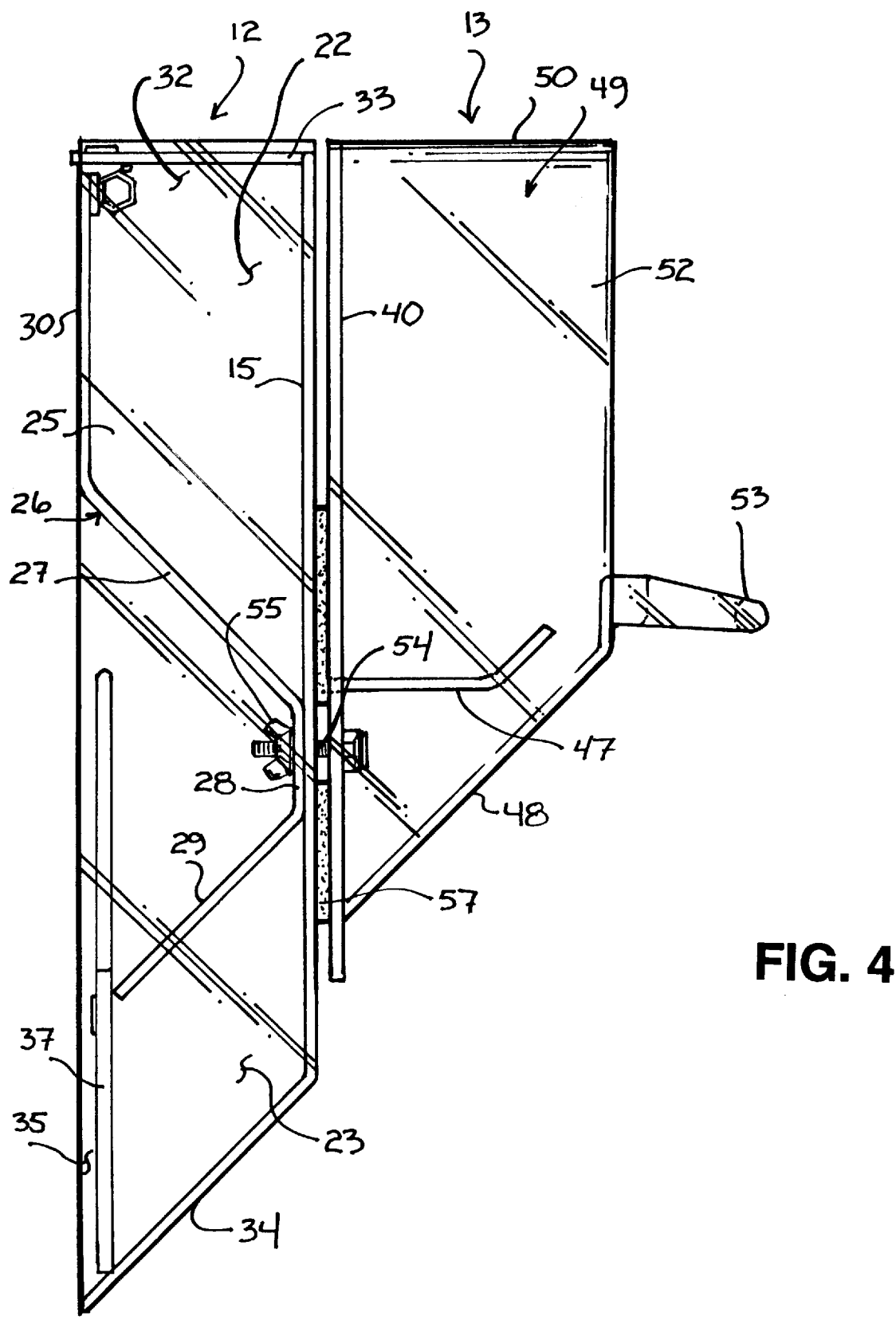
FIG. 4 is a side view of the bird feeder of FIGS. 1–3.

Referring now to FIGS. 2–4, outer portion 12 includes a vertical base 15 having an inner surface 17, an outer surface 18, and upper and lower openings 19 and 20, respectively. Upper and lower opening 19 and 20 are vertically spaced apart and formed through base 15 proximate the lower end thereof. A feed reservoir 22, positioned proximate the upper end of outer portion 12, and recapture reservoir 23, positioned under feed reservoir 22 proximate the lower end of outer portion 15, are defined by sidewalls 24 and 25 extending outwardly from opposing sides of base 15 and a front panel 26 opposing base 15. Front panel 26 consists of an upper portion and an intermediate portion. The upper portion is simply a wall 30 opposing base 15. The intermediate portion forms a sloped bottom 27 for feed reservoir 22, a coupling panel 28, and a top 29 for recapture reservoir 23.

Feed reservoir 22 is further defined by sloped bottom 27 extending from wall 30, and sloping downwardly to base 15 at the lower edge of upper opening 19. A supply opening 32 is formed at the top of feed reservoir 22, defined by base 15, sidewalls 24 and 25, and wall 30, and closed by a lid 33. Lid 33 is moveable between an open position, allowing feed to be inserted into feed reservoir 22, and a closed position, keeping the contents of feed reservoir 22 safe from contamination.

Recapture reservior 23 is further defined by a sloped bottom 34 coupled to the bottom edges of sidewalls 24 and 25 and base 15. Sloped bottom 34 is sloped downwardly in an outward direction, toward an access opening 35 which is closed by a lid 37. Lid 37 is moveable between an open position, allowing the contents of recapture reservoir 23 to be removed, and a closed position, keeping the contents of recapture reservoir 23 within. Top 29 protects the recaptured feed from contamination from an outside source. Lower opening 20 of base 15 is positioned such that it communicates with recapture reservoir 23 near the top. The purpose for the position of lower opening 20 relative recapture reservoir 23 will be discussed later in the description.

Still referring to FIGS. 2–4, inner portion 13 includes a vertical base 40 having an inner surface 42, an outer surface 43, and upper and lower openings 44 and 45, respectively. Upper and lower openings 44 and 45 are vertically spaced apart and formed through base 40 proximate the lower end thereof. A trough 47 is couple to inner surface 42 of base 40 at the lower edge of upper opening 44. In this specific embodiment, trough 47 is an angled sheet extending generally perpendicularly from base. It will be understood that trough 47 may be of substantially any shape which will carry a desired quantity of bird feed. A chute 48 is coupled to inner surface 42 of base 40 at the lower edge of lower opening 45. Chute 48 extends inwardly, away from base 40, and is positioned under trough 47 for receiving uncontaminated bird feed displaced therefrom. Trough 47 is sloped downwardly toward base 40 to direct displaced feed towards lower opening 45.

Inner portion 13 also includes a hood 49 which encloses trough 47 and chute 48, limiting access to trough 47 and preventing contamination of trough 47 and chute 48. Hood 49 has a top 50 and sidewalls 52 and 53 coupled to base 40, leaving an open side adjacent trough 47. A perch 53 is coupled to inner portion 13 at the open side of hood 49 proximate trough 47. In this specific embodiment perch 53 is coupled to and spaced from she distal end of chute 48, but one skilled in the art will understand that perch 53 can be positioned in substantially any location giving access to trough 47 while being positioned so at not to overlying chute 48 and thereby preventing contamination of chute 48 and recapture reservoir 23. Perch 53 provides a support upon which birds may rest to obtain access to trough 47.

Referring specifically to FIGS. 2 and 4, inner portion 13 and outer portion 12 are coupled together by attachment members extending concurrently through base plates 40 and 15, and coupling panel 28, between upper openings 19 and 44 and lower openings 20 and 45. In this embodiment attachment members are bolts 54 retained in position by wing nuts 55, but can be other members such as hooks, snaps, adhesives, etc. When properly coupled, upper openings 19 and 44 and lower openings 20 and 45 of bases 15 and 40 align. To ensure communication between the respective openings, a plate 57 of resilient material is positioned between outer portion 12 and inner portion 13, against inner surface 17 and outer surface 43 respectively. Plate 57 includes an upper opening 58 corresponding to upper openings 19 and 44, a lower opening 59 corresponding to lower openings 20 and 45 and apertures 60 for receiving bolts 54, positioned intermediate upper opening 58 lower opening 59.

Referring back to FIG. 1, when installing bird feeder 10, outer portion 12 with plate 57 carried against inner surface 17, is fitted against partition 14. Inner portion 13 is fitted such that outer surface 43 rests against partition 14 opposite outer portion 12. It should be noted that an additional plate, identical to plate 57, may be positioned on the opposite side of partition 14 and carried against outer surface 43. In this manner, partition 14 is sandwiched between plates, providing an even more secure seal. Bolts 54 are inserted through base 40, passing through partition 14, apertures 60 of plate 57 and exiting through base 15 and coupling panel 28. The intermediate portion of front panel 26 is inset at coupling panel 28 to reduce the length of bolts 54 and to provide a more stable coupling. Plate 57 is preferably formed of a resilient material such as rubber, to allow distortion of the material around the mesh of partition 14. The mesh of partition 14 will depress into the surface of plate 57 as wing nuts 55 are tightened, providing a close coupling of outer portion 12 and 26 inner portion 13. It can be seen that bird feeder 10 can be coupled to substantially any wall as long as there is communication between openings 19, 20, 44, 45, 59 and 59, and bolts 54 can pass through.

In operation, feed is inserted through supply opening 32, filling feed reservoir 22. Lid 33 is closed to prevent contamination of the feed by an outside source. Feed from feed reservoir 22 is moved down sloped bottom 27 and concurrently through openings 19, 58 and 44 and onto trough 47. Feed from feed reservoir 22 continually replenishes trough 47 as feed is removed. A bird resting on perch 53 can reach trough 47 to ingest feed. Some feed will be displaced by the bird, but this is reduced by hood 49 limiting access to trough 47. Displaced feed drops from trough 47 and is caught by chute 48. The displaced feed is directed down chute 48 concurrently through openings 45, 59 and 20 and into recapture reservoir 23. When recapture reservoir 23 has collected a sufficient amount of feed, lid 37 is opened and the feed is removed to be re-used. The feed can be re-used since it is clean and uncontaminated. Contamination of the recaptured feed is prevented by the position of perch 53 so as not to overlie chute 48, and the inclusion of hood 49 to prevent birds from directly contaminating trough 47 or chute 48, and to direct displaced feed on to chute 48.

In the present embodiment, feeder 10 is constructed of transparent or translucent material such as an acrylic, to permit the levels of feed in each reservoir to be readily determined, and to reduce the effect the feeder has on the birds. Birds have less tendency to be afraid of a clear or transparent feeder. It will be understood that many materials such as metal, wood, plastic, etc. can be used to fabricate feeder 10, and they need not be transparent. Furthermore, outer portion 12 and inner portion 13 can be fabricated in many different manners, such as by coupling many elements together or molding in pieces or in their entirety.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A bird feeder for use with an enclosure and for recapturing bird feed for re-use, the bird feeder comprising:
   a feed reservoir positionable outside the enclosure for receiving bird feed and having a feeder opening;
   a trough positionable inside the enclosure and coupled to the feed reservoir at the feed opening for receiving feed from the feed reservoir;
   a recapture reservoir coupled to the feed reservoir for receiving and collecting uncontaminated bird feed displaced from the trough, the recapture reservoir including a recapture bin positionable outside the enclosure and a chute positionable inside the enclosure, the chute is positioned under the trough and sloped to direct displaced feed into the recapture bin;
   a perch coupled proximate the trough and upon which birds may rest to obtain access to the trough, the perch being positioned so as not to overlie the chute and thereby preventing contamination of the recapture reservoir;
   the feed reservoir including a bottom sloped downward, in a direction toward the perch, to the trough; and
   a shield enclosing the trough and chute, the shield having an open side adjacent the perch allowing access to the trough by birds.

2. A bird feeder for recapturing bird feed for re-use, the bird feeder comprising:
   a first element including a feed reservoir having a dispense opening for dispensing bird food and a recapture reservoir having a collection opening, the recapture reservoir receiving and collecting displaced and uncontaminated bird feed;
   a second element including a trough for receiving bird feed from the feed reservoir, and a chute positioned under the trough; and
   coupling means for coupling the first element to the second element such that the dispense opening is positioned adjacent the trough and the chute is positioned adjacent the collection opening of the recapture reservoir.

3. A bird feeder as claimed in claim 2 wherein the chute positioned under the trough is sloped to direct displaced feed into the recapture bin through the collection opening.

4. A bird feeder as claimed in claim 3 further including a perch coupled proximate the trough and upon which birds may rest to obtain access to the trough, the perch being positioned so as not to overlie the chute and thereby preventing contamination of the recapture reservoir.

5. A bird feeder as claimed in claim 4 wherein the feed reservoir includes a bottom sloped downward to the dispense opening.

6. A bird feeder as claimed in claim 5 wherein the second element further includes a shield enclosing the trough and chute and having an open side adjacent the perch, which is positioned outside the shield, for allowing birds access to the trough from the perch.

7. A bird feeder as claimed in claim 2 wherein the coupling means include a plate of resilient material positioned between the first element and the second element, the plate including a first opening corresponding to the dispense opening, and a second opening corresponding to the collection opening.

8. A bird feeder couplable to an enclosure for recapturing bird feed for re-use, the bird feeder comprising:
   a first element positionable adjacent an outer side of the enclosure, the first element including:
      a feed reservoir having a supply opening for receiving bird feed, a dispense opening, and a sloped bottom for moving bird feeder toward the dispense opening;
      a recapture reservoir coupled below the feed reservoir, the recapture reservoir having a collection opening, an access and a sloped bottom for moving bird feed toward the access opening;
   a second element positionable adjacent an inner side of the enclosure, the second element including:
      a trough for receiving bird feed from the feed reservoir.
      a chute positioned under the trough for receiving uncontaminated bird feed displaced from, the trough;
      a shield enclosing the trough and chute and having an open side adjacent trough; and
   coupling means for coupling the first element to the second element such that the dispense opening is positioned adjacent the trough and the chute is positioned adjacent the collection opening of the recapture reservoir, the side of the enclosure capturable therebetween.

9. A bird feeder as claimed in claim 8 further including a perch coupled to the first element at the open side of the shield proximate the trough and upon which birds may rest to obtain access to the trough, the perch being positioned outside the shield so at not to overlying the chute and thereby preventing contamination of the recapture reservoir.

10. A bird feeder as claimed in claim 9 wherein the coupling means includes a plate of resilient material positioned between the first element and the second element, the plate including a first opening corresponding to the dispense opening and a second opening corresponding to the collect opening.

11. A bird feeder as claimed in claim 10 further including a lid coupled to the first element proximate the supply opening so as to be movable between an open and a closed position, the closed position closing the supply opening.

12. A bird feeder as claimed in claim 11 further including a lid coupled to the first element proximate the supply opening so as to be movable between an open and a closed position, the closed position closing the access opening.

* * * * *

UNITED STATES PATENT AND TRADEMARK OFFICE
CERTIFICATE OF CORRECTION

PATENT NO. : 5,771,838
DATED : June 30, 1998
INVENTOR(S) : DAVID SCOTT BLOOM; MICHAEL ANDREW BLOOM; DRUCELLA ANN BLOOM; TIMOTHY K. BLOOM It is certified that error appears in the above-indentified patent and that said Letters Patent is hereby corrected as shown below:

Column 6, Line 27, insert --opening-- between "access" and "and".
Column 6, Line 32, replace "." with --;--.
Column 6, Line 34, delete "," between "from" and "the".

Signed and Sealed this

Seventeenth Day of November, 1998

Attest:

BRUCE LEHMAN

Attesting Officer      Commissioner of Patents and Trademarks